US012651787B2

(12) United States Patent (10) Patent No.: US 12,651,787 B2
Chen et al. (45) Date of Patent: Jun. 9, 2026

(54) COOLANT CONTAINMENT SYSTEM FOR A BATTERY PACK

(71) Applicant: GM Global Technology Operations LLC, Detroit, MI (US)

(72) Inventors: William Yu Chen, Troy, MI (US); Xianfeng Yan, Clawson, MI (US); Qaiser Khan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 502 days.

(21) Appl. No.: 18/476,671

(22) Filed: Sep. 28, 2023

(65) Prior Publication Data

US 2025/0112294 A1 Apr. 3, 2025

(51) Int. Cl.
| | |
|---|---|
| *H01M 10/6568* | (2014.01) |
| *B60L 50/64* | (2019.01) |
| *H01M 10/613* | (2014.01) |
| *H01M 10/6554* | (2014.01) |
| *H01M 10/6556* | (2014.01) |
| *H01M 50/204* | (2021.01) |
| *H01M 50/258* | (2021.01) |
| *H01M 50/691* | (2021.01) |

(52) U.S. Cl.
CPC ..... *H01M 10/6568* (2015.04); *H01M 10/613* (2015.04); *H01M 10/6554* (2015.04); *H01M 10/6556* (2015.04); *H01M 50/204* (2021.01); *H01M 50/258* (2021.01); *H01M 50/691* (2021.01); *B60L 50/64* (2019.02); *H01M 2220/20* (2013.01)

(58) Field of Classification Search
CPC ......... H01M 10/6567; H01M 10/6568; H01M 10/613; H01M 10/6554; H01M 10/6556; H01M 10/4228; H01M 10/625; H01M 50/204; H01M 50/258; H01M 50/141
See application file for complete search history.

(56) References Cited

U.S. PATENT DOCUMENTS

| | | | |
|---|---|---|---|
| 2016/0172644 A1 | 6/2016 | Goldman et al. | |
| 2022/0149453 A1* | 5/2022 | Zhang | B60L 58/26 |
| 2023/0095960 A1* | 3/2023 | Park | H01M 10/6554 |
| | | | 429/437 |
| 2024/0014464 A1* | 1/2024 | Jang | H01M 10/647 |

FOREIGN PATENT DOCUMENTS

| | | |
|---|---|---|
| DE | 102022130847 A1 | 5/2024 |
| EP | 4228061 A1 | 8/2023 |

* cited by examiner

*Primary Examiner* — Allison Bourke
*Assistant Examiner* — Travis L. Martin
(74) *Attorney, Agent, or Firm* — Vivacqua Crane, PLLC

(57) ABSTRACT

A coolant containment system for a battery pack includes a coolant retention container defining a containment space, an inlet connected to the coolant retention container, the inlet connected to an inlet line configured to receive a coolant, an outlet connected to the coolant retention container, the outlet connected to an outlet line, the outlet line configured return a coolant, a drain plug connected to the coolant retention container and in communication with the containment space. The inlet line and the outlet line are disposed entirely within the containment space and any coolant from a leak is retained within the containment space and exits the containment space to an environment outside the battery tray via the drain plug.

14 Claims, 4 Drawing Sheets

COOLANT CONTAINMENT SYSTEM FOR A BATTERY PACK

INTRODUCTION

The present disclosure relates to a coolant retainment system for a battery pack. More particularly, the present disclosure relates to a coolant containment system that retains leaked coolant away from battery cells or other high voltage components within the battery pack.

Electric vehicles and hybrid vehicles employ a high voltage electric battery system that includes a number of battery cells, typically packaged as multiple battery modules within a battery pack. The battery pack is often located under the vehicle body midway between the front and rear wheels. The battery pack includes thermal management systems to heat and/or cool the battery cells during use. These thermal management systems may include cooling plates that circulate coolant. Battery packs with cooling plates may have a risk of a coolant leak at joints between various coolant carrying components. While these systems are effective, there is a need in the art for a system that isolates possible coolant leaks from battery cells and other high voltage components.

SUMMARY

A coolant containment system for a battery pack is provided. The coolant containment system includes a coolant retention container defining a containment space, an inlet connected to the coolant retention container, the inlet connected to an inlet line configured to receive a coolant, an outlet connected to the coolant retention container, the outlet connected to an outlet line, the outlet line configured to return the coolant, and a drain plug connected to the coolant retention container and in communication with the containment space. The inlet line and the outlet line are disposed entirely within the containment space. The coolant from a leak is retained within the containment space and exits the containment space to an environment outside the battery pack via the drain plug.

In one aspect, the coolant retention container includes retainer side walls and a bottom wall, and the inlet and the outlet are disposed in one of the retainer side walls.

In another aspect, a one-way valve is disposed in one of the retainer side walls of the coolant retention container, the one-way valve configured to allow the coolant from the battery pack to enter the containment space.

In another aspect, the one-way valve is located adjacent the bottom wall of the coolant retention container.

In another aspect, the bottom wall defines an opening, and the opening is configured to be aligned with an inlet spigot and an outlet spigot of a cooling plate.

In another aspect, a seal is disposed around the opening to seal the opening to the cooling plate.

In another aspect, the drain plug is disposed beneath the inlet and the outlet relative to the coolant retention container.

In another aspect, the inlet and the outlet extend through the coolant retention container.

In another embodiment, a battery pack is provided. The battery pack includes a battery tray, a cooling plate disposed within the battery tray, the cooling plate having an inlet spigot connected to an inlet line for receiving a coolant, and a coolant containment system connected to the battery tray. The coolant containment system includes a coolant retention container defining a containment space, an inlet disposed in the coolant retention container, the inlet connected to the inlet line, and a drain plug connected to the coolant retention container and in communication with the containment space, the drain plug configured to provide one-way fluid communication from the containment space to an environment outside the battery pack. The inlet spigot and the inlet line are disposed entirely within the containment space. The coolant from a leak is retained within the containment space and exits the containment space to the environment outside the battery tray via the drain plug.

In one aspect, the cooling plate further includes an outlet spigot connected to an outlet line, and wherein the coolant containment system further includes an outlet disposed in the coolant retention container, the outlet connected to the outlet line, and wherein the outlet spigot and the outlet line are disposed within the containment space.

In another aspect, the cooling plate is disposed between a base plate of the battery tray and a bottom wall of the coolant containment system.

In another aspect, the coolant retention container includes retainer side walls connected to the bottom wall to define the containment space, and the inlet and the outlet are disposed in one of the retainer side walls.

In another aspect, the battery tray includes a side wall that defines a window, and the inlet and the outlet are aligned with the window.

In another aspect, a seal is disposed between the battery tray and the coolant retention container and surrounding the window.

In another aspect, the bottom wall of the coolant retention container defines an opening, and the inlet spigot and the outlet spigot extend through the opening into the containment space.

In another aspect, another seal is disposed between the cooling plate and the bottom wall of the coolant retention container and surrounding the opening.

In another aspect, a one-way valve is disposed in one of the retainer side walls of the coolant retention container, the one-way valve configured to allow any coolant located in the battery tray to enter the containment space.

In another aspect, the one-way valve is located adjacent the bottom wall of the coolant retention container.

In another aspect, the drain plug is disposed beneath the inlet and the outlet relative to the coolant retention container and disposed above the one-way valve relative to the coolant retention container.

In yet another embodiment, a battery pack is provided. The battery pack includes a battery tray, a cooling plate disposed within the battery tray, the cooling plate having an inlet spigot connected to an inlet line for receiving a coolant, and an outlet spigot connected to an outlet line for returning the coolant, a plurality of battery modules disposed on the cooling plate, and a coolant containment system connected to the battery tray. The coolant containment system includes a coolant retention container having a plurality of retainer side walls connected to a bottom wall and defining a containment space, the bottom wall defining an opening through which the inlet spigot and outlet spigot extend therethrough, an inlet disposed in one of the retainer side walls of the coolant retention container and extending therethrough, the inlet connected to the inlet line, an outlet disposed in the one retainer side wall of the coolant retention container and extending therethrough, the outlet connected to the outlet line, a drain plug disposed in the one retainer side wall of the coolant retention container and in communication with the containment space, the drain plug allowing one-way fluid communication from the containment space to an environment outside the battery pack, and a one-way valve disposed in another of the retainer side walls of the coolant retention container, the one-way valve configured to allow any coolant located in the battery tray to enter the containment space. The inlet spigot, outlet spigot, the inlet line, and outlet line are disposed entirely within the containment space. The coolant from a leak is retained within the containment space and exits the containment space to the environment outside the battery tray via the drain plug.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
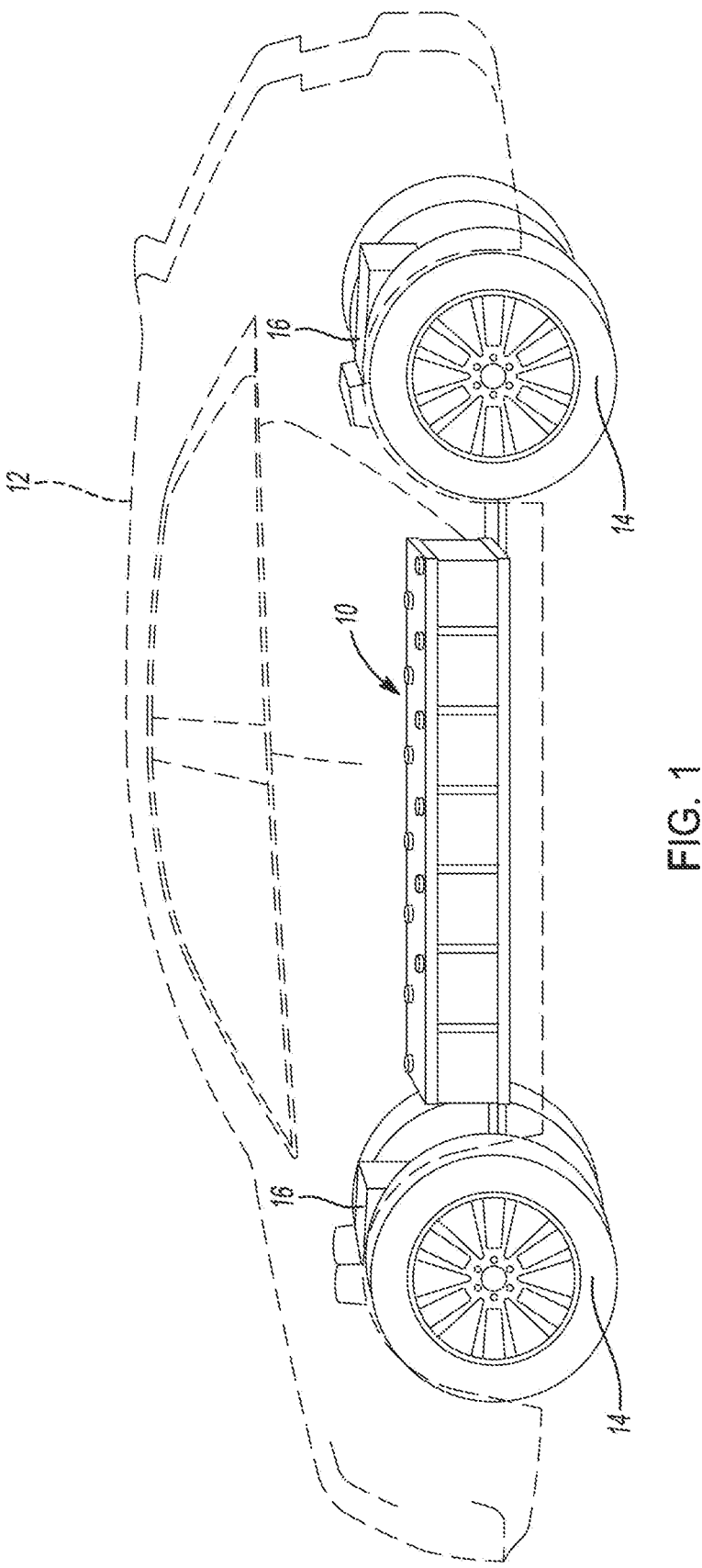
FIG. 1 is schematic view of an exemplary motor vehicle having a battery pack and coolant containment system according to the principles of the present disclosure.

Referring to FIG. 1, a battery pack 10 having a coolant containment system (discussed in greater detail below) according to the principles of the present disclosure is shown. The battery pack 10 is illustrated with an exemplary vehicle 12. The vehicle 12 is preferably an electric vehicle or hybrid vehicle having wheels 14 driven by electric motors/inverters 16. The electric motors/inverters 16 receive motive power from the battery pack 10. While the vehicle 12 is illustrated as a passenger road vehicle, it should be appreciated that the battery pack 10 may be used with various other types of vehicles. For example, the battery pack 10 may be used in nautical vehicles, such as boats, or aeronautical vehicles, such as drones or passenger airplanes. Moreover, the battery pack 10 may be used as a stationary power source separate and independent from a vehicle.

Figure 2:
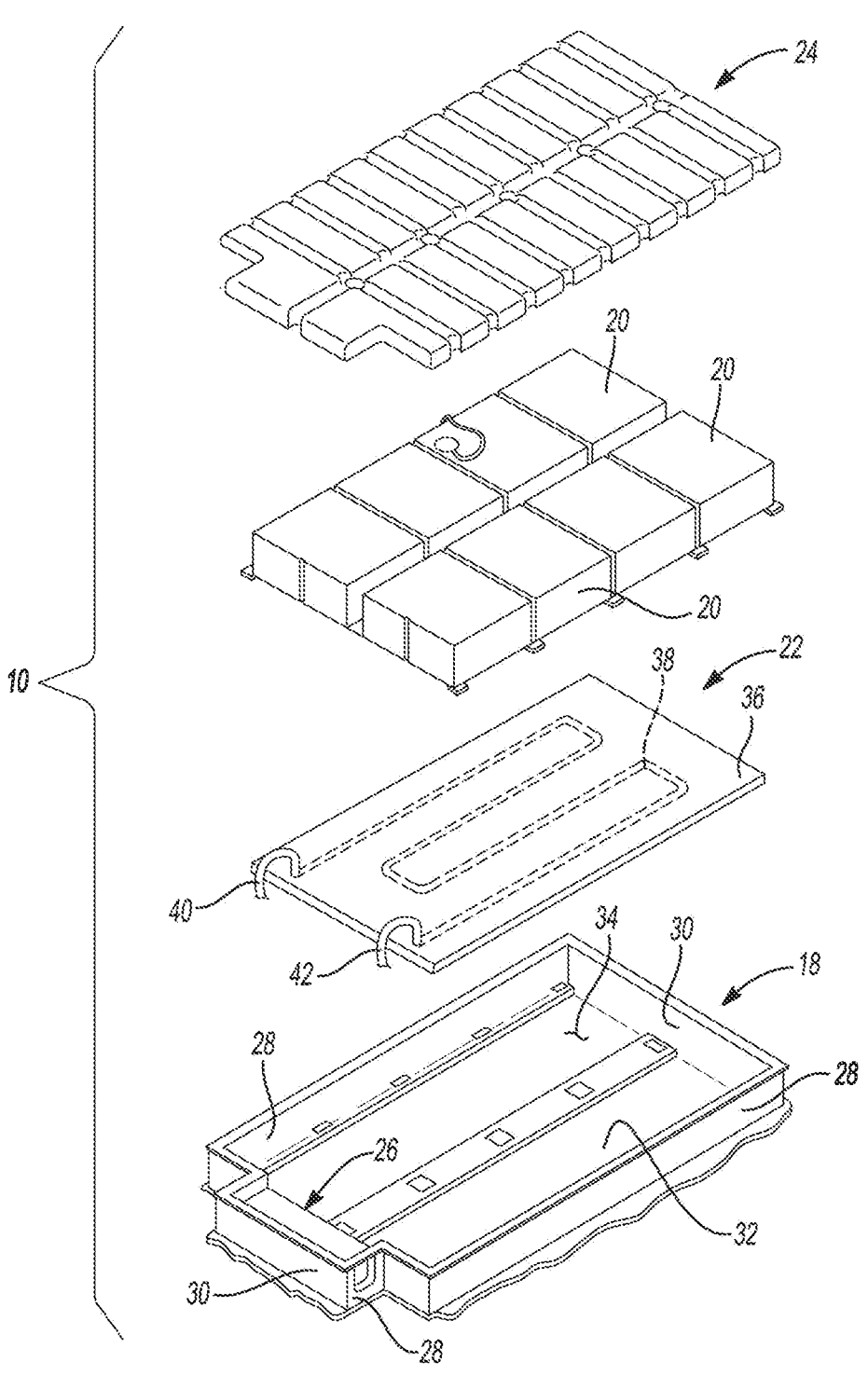
FIG. 2 is a perspective, exploded view of the battery pack and the coolant containment system.

Turing to FIG. 2, the battery pack 10 generally includes a battery tray 18, a plurality of battery modules 20, a cooling plate 22, a cover 24, and a coolant containment system 26. The cooling plate 22 forms part of a battery thermal management system. The battery pack 10 may further include a battery management system (not shown).

The battery tray 18 is connected to a frame of the vehicle 12. The battery tray 18 provides structural support to the plurality of the battery modules 20. The battery tray 18 includes side walls 28, end walls 30, and a base plate 32. The side walls 28 and end walls 30 are connected to the base plate 32 and cooperate to define a battery module cavity 34.

The plurality of battery modules 20 are disposed within the battery module cavity 34 of the battery tray 18. The plurality of battery modules 20 each include a plurality of battery cells (not shown). The battery cells are lithium-ion battery cells. However, it should be appreciated that any type of battery cell may be employed. In addition, the battery cells may be cylindrical battery cells, prismatic can battery cells, or pouch battery cells without departing from the scope of the present disclosure. The plurality of battery modules 20 provide motive power to the electric motors/inverters 16 (FIG. 1).

The cooling plate 22 is part of the battery thermal management system and provides heating and cooling to the battery modules 20. The cooling plate 22 is disposed between the battery tray 18 and the plurality of battery modules 20. The cooling plate includes a body 36 defining a coolant channel 38 therethrough. The coolant channel 38 directs a coolant throughout the body 36 to provide heat transfer to the plurality of battery modules 20. An inlet line 40 and an outlet line 42 are connected to the coolant channel 38. The inlet line 40 provides coolant to the cooling plate 22. The outlet line 42 receives coolant from the cooling plate 22. The inlet line 40 and the outlet line 42 are in fluid communication with the battery thermal management system, including a pump, heat exchanger, and fluid reservoir (not shown).

The cover 24 is disposed overtop the plurality of battery modules 20. The cover 24 is connected to the battery tray 18 and cooperates with the battery tray 18 to enclose the plurality of battery modules 20.

The coolant containment system 26 provides a containment or retention area around particular components of the battery pack 10 in the event of a coolant leak. The coolant containment system 26 is connected to the battery tray 18 at the side wall 28. Alternatively, the coolant containment system 26 may be connected at the end walls 30.

Figure 3:
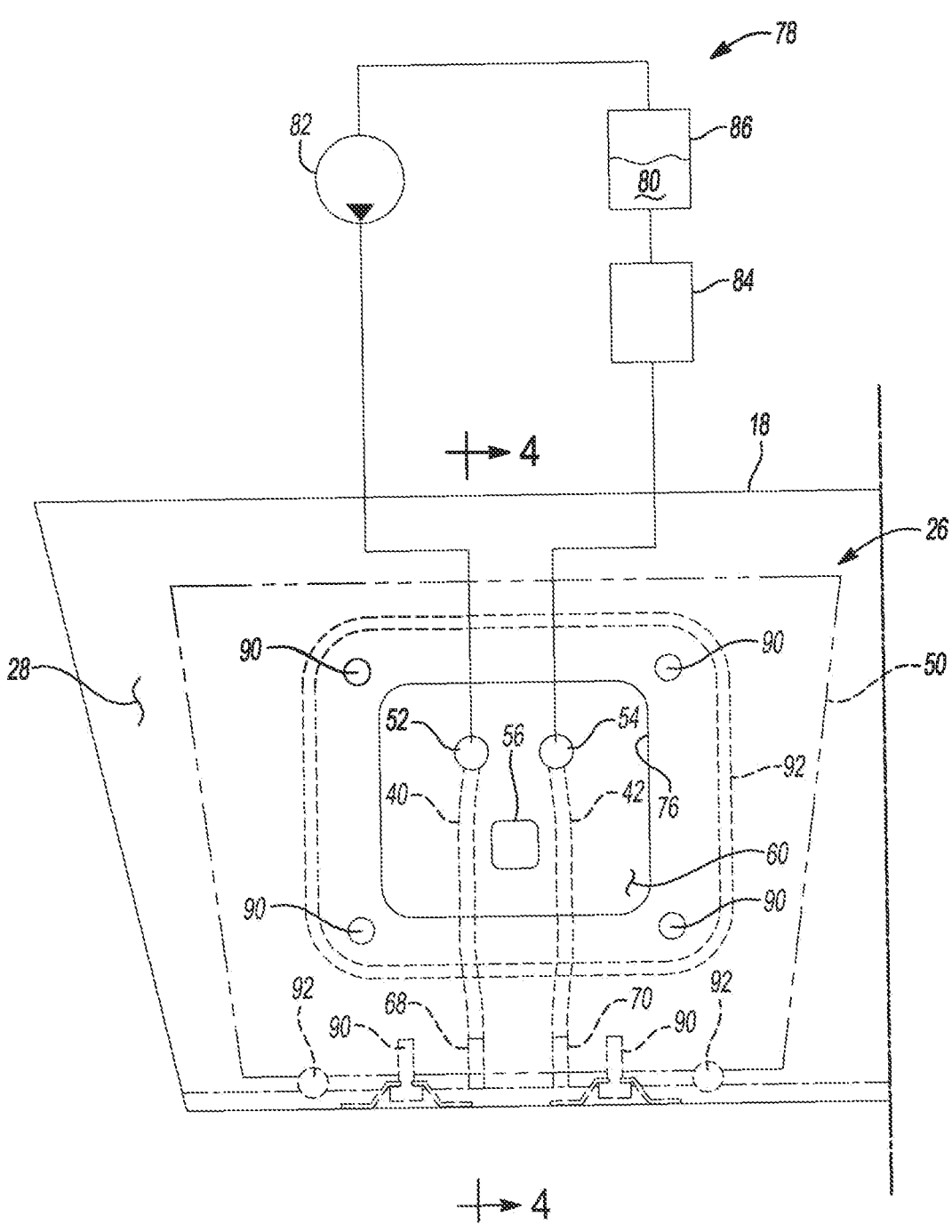
FIG. 3 is a side view of the battery pack and the coolant containment system.
Figure 4:
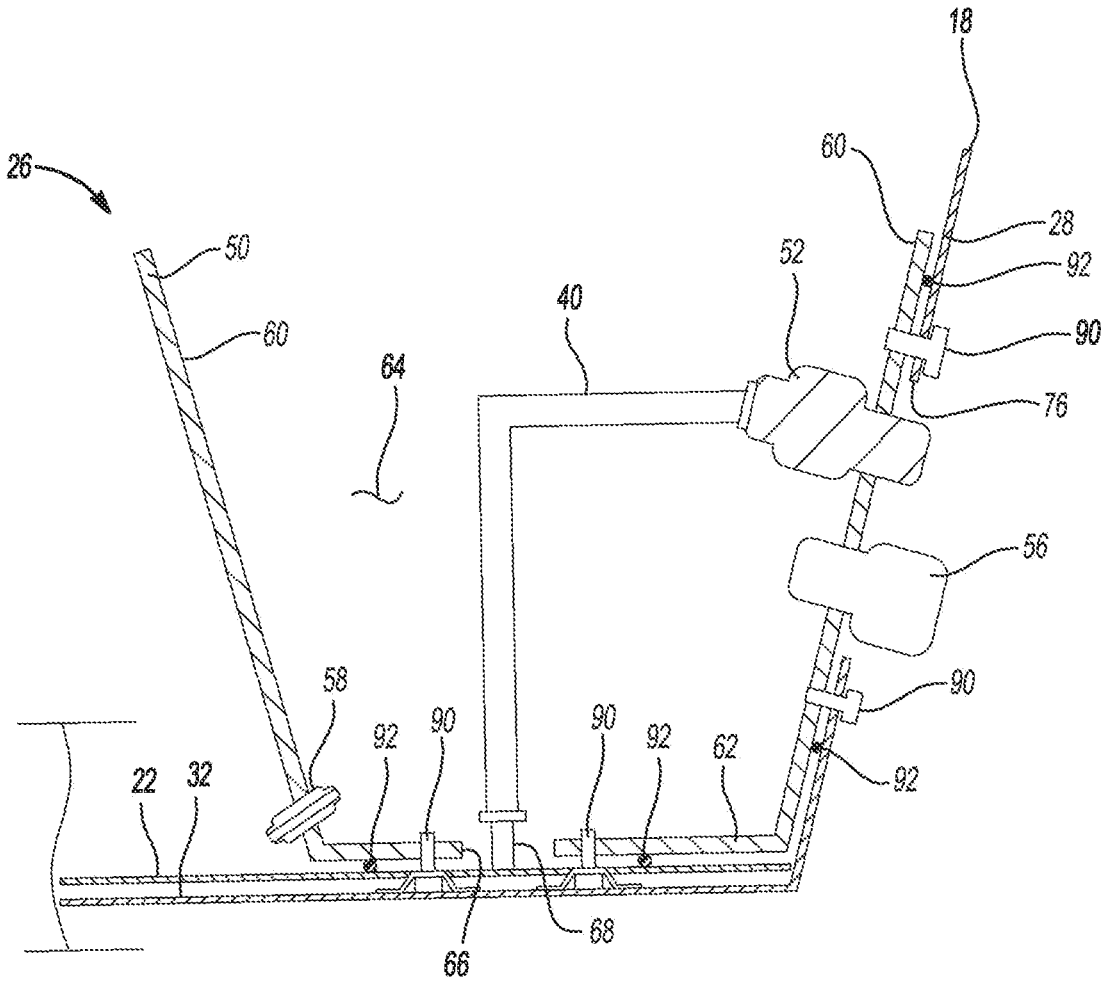
FIG. 4 is a cross-section viewed in the direction of arrows 4-4 in FIG. 3 of the battery pack and the coolant containment system.

With reference to FIGS. 3 and 4, the coolant containment system 26 is shown relative to the battery tray 18 and the cooling plate 22. The coolant containment system 26 includes a coolant retention container 50, an inlet 52, an outlet 54, a drain plug 56, and a one-way valve 58.

The coolant retention container 50 is configured to encompass or surround connection joints of the cooling plate 22, including the inlet line 40 and outlet line 42, and to retain coolant therein, as will be described in greater detail below. Therefore, a portion of the cooling plate 22 is disposed between the coolant retention container 50 and the battery tray 18. The coolant retention container 50 includes retainer side walls 60 connected to a bottom wall 62. The retainer side walls 60 and the bottom wall 62 cooperate to define a containment space 64 within the coolant retention container 50.

The coolant retention container 50 includes an opening 66 defined in the bottom wall 62. The cooling plate 22 includes an inlet spigot 68 and an outlet spigot 70 that extend through the opening 66. The inlet spigot 68 is connected to the inlet line 40. The outlet spigot 70 is connected to the outlet line 42. Thus, the connections between the cooling plate 22 and the inlet line 40 and the outlet line 42 are disposed within the containment space 64. Likewise, the inlet line 40 and the outlet line 42 are disposed within the containment space 64.

The inlet 52 is disposed in, and extends through, the retainer side wall 60 and is connected to the inlet line 40 within the containment space 64. Likewise, the outlet 54 is disposed in, and extends through, the retainer side wall 60 and is connected to the outlet line 42 within the containment space 64. The inlet 52 and the outlet 54 align with a window 76 in the side wall 28 of the battery tray 18.

The inlet 52 and the outlet 54 are configured to be connected to a battery thermal management system 78 to receive a coolant 80 therefrom. The battery thermal management system 78 that generally includes a pump 82, a heat exchanger 84, and a recovery tank 86. The battery thermal management system 78 may include various other components including temperature and humidity sensors, valves, and electronic controllers, without departing from the scope of the present disclosure. Generally, the pump 82 is in fluid communication with the recovery tank 86 and pumps the coolant 80 from the recovery tank 86 to the inlet 52. The coolant 80 is routed to the cooling plate 22 via the inlet line 40 to in order to regulate the temperature of the battery cells within the battery modules 20. The coolant 80 is subsequently returned from the cooling plate 22 to outlet 54 via the outlet line 42, and then communicated to the heat exchanger 84. The heat exchanger 84 removes heat from the coolant 80, for example, using a liquid to air heat exchanger with a fan, though other types of heat exchangers may be employed. The coolant 80 is returned to the recovery tank 86.

The drain plug 56 is configured to empty the coolant retention container 50 of coolant 80 in the event of a leak. The drain plug 56 is disposed within the retainer side wall 60 and is also aligned with the window 76 of the battery tray 18. The drain plug 56 is a passive one-way valve that allows fluid communication from the containment space 64 to an environment outside the battery tray 18. The drain plug 56 may be a passive valve that opens to allow fluid communication based on pressure, or an active valve electronically controlled by a solenoid. The drain plug 56 is disposed beneath the inlet 52 and the outlet 54 relative to the coolant retention container 50. Both the drain plug 56 and one-way valve 58 are preferably disposed as low in the coolant retention container 50 as feasible, but their height can be adjusted based on packaging space.

The one-way valve 58 is configured to allow coolant 80 that leaks from the cooling plate 22 outside the connection points (i.e., the spigots 68, 70, lines 40, 42, and inlet 52 and outlet 54) to enter the containment space 64 of the coolant retention container 50. The one-way valve 58 is disposed in, and extends through, the retainer side wall 60 at the bottom (i.e., adjacent or directly adjacent the bottom wall 62) of the coolant retention container 50. The one-way valve 58 thus communicates with the battery module cavity 34 and the containment space 64. In one embodiment, the one-way valve 58 is disposed on an opposite retainer side wall 60 as the drain plug 56. Coolant 80 that leaks within the battery tray 18 but outside the coolant retention container 50 enters the containment space 64 through the one-way valve 58 and is retained within the containment space 64 until discharged through the drain plug 56.

The coolant retention container 50 is connected to the battery tray 18 and cooling plate 22 by mechanical fasteners 90. For example, the bottom wall 62 of the coolant retention container 50 is connected to the base plate 32 of the battery tray 18 and cooling plate 22 by the mechanical fasteners 90. Additionally, one or more retainer side walls 60 are connected to one or more of the side walls 28 of the battery tray 18 by the mechanical fasteners 90.

A plurality of ring seals 92 are disposed around the mechanical fasteners 90 at the connection points between the coolant retention container 50 and the battery tray 18 and cooling plate 22 and surrounding the opening 66 and the window 76.

The coolant containment system 26 is configured to isolate and retain any coolant leaks that occur within the battery pack 10. By locating connections or joints that contain coolant within the containment space 64, the coolant is prevented from reaching high voltage components or other sensitive components. Excess coolant is drained outside the battery pack 10 via the drain plug 56. Any coolant leakage that occurs outside the coolant containment system 26 can enter the containment space 64 via the one-way valve 58, thus protecting the battery pack components. The coolant containment system 26 therefore lowers the risk of high voltage arcing and cell thermal runaway if a coolant leak occurs inside the battery pack 10. Coolant is isolated in a single location and the coolant containment system 26 facilitates rapid drainage of the coolant outside the battery pack 10. Finally, the integration of the inlet 52, the outlet 54, the drain plug 56, and the one-way valve 58 in the coolant retention container 50 reduces assembly time.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A coolant containment system for a battery pack, the coolant containment system comprising:
   a coolant retention container defining a containment space;
   an inlet connected to the coolant retention container, the inlet connected to an inlet line configured to receive a coolant;
   an outlet connected to the coolant retention container, the outlet connected to an outlet line, the outlet line configured to return the coolant; and
   a drain plug connected to the coolant retention container and in communication with the containment space,
   wherein the inlet line and the outlet line are disposed entirely within the containment space,
   wherein the coolant from a leak is retained within the containment space and exits the containment space to an environment outside the battery pack via the drain plug,
   wherein the coolant retention container includes retainer side walls and a bottom wall, the inlet and the outlet are disposed in one of the retainer side walls, and
   further comprising a one-way valve disposed in one of the retainer side walls of the coolant retention container, the one-way valve configured to allow the coolant from the battery pack to enter the containment space.

2. The coolant containment system of claim 1, wherein the one-way valve is located adjacent the bottom wall of the coolant retention container.

3. The coolant containment system of claim 1, wherein the bottom wall defines an opening, and the opening is configured to be aligned with an inlet spigot and an outlet spigot of a cooling plate.

4. The coolant containment system of claim 3, further comprising a seal disposed around the opening to seal the opening to the cooling plate.

5. The coolant containment system of claim 1, wherein the drain plug is disposed beneath the inlet and the outlet relative to the coolant retention container.

6. The coolant containment system of claim 1, wherein the inlet and the outlet extend through the coolant retention container.

7. A battery pack comprising:
   a battery tray;
   a cooling plate disposed within the battery tray, the cooling plate having an inlet spigot connected to an inlet line for receiving a coolant; and
   a coolant containment system connected to the battery tray, the coolant containment system comprising:

a coolant retention container defining a containment space;

an inlet disposed in the coolant retention container, the inlet connected to the inlet line; and a drain plug connected to the coolant retention container and in communication with the containment space, the drain plug configured to provide one-way fluid communication from the containment space to an environment outside the battery pack, wherein the inlet spigot and the inlet line are disposed entirely within the containment space, wherein the coolant from a leak is retained within the containment space and exits the containment space to the environment outside the battery tray via the drain plug, wherein the cooling plate further includes an outlet spigot connected to an outlet line, and wherein the coolant containment system further includes an outlet disposed in the coolant retention container, the outlet connected to the outlet line, wherein the outlet spigot and the outlet line are disposed within the containment space, wherein the cooling plate is disposed between a base plate of the battery tray and a bottom wall of the coolant containment system, wherein the coolant retention container includes retainer side walls connected to the bottom wall to define the containment space, the inlet and the outlet are disposed in one of the retainer side walls, and further comprising a one-way valve disposed in one of the retainer side walls of the coolant retention container, the one-way valve configured to allow any coolant located in the battery tray to enter the containment space.

8. The battery pack of claim 7, wherein the battery tray includes a side wall that defines a window, and the inlet and the outlet are aligned with the window.

9. The battery pack of claim 8, further comprising a seal disposed between the battery tray and the coolant retention container and surrounding the window.

10. The battery pack of claim 9, wherein the bottom wall of the coolant retention container defines an opening, and the inlet spigot and the outlet spigot extend through the opening into the containment space.

11. The battery pack of claim 10, further comprising another seal disposed between the cooling plate and the bottom wall of the coolant retention container and surrounding the opening.

12. The battery pack of claim 7, wherein the one-way valve is located adjacent the bottom wall of the coolant retention container.

13. The battery pack of claim 12, wherein the drain plug is disposed beneath the inlet and the outlet relative to the coolant retention container and disposed above the one-way valve relative to the coolant retention container.

14. A battery pack comprising:

a battery tray;

a cooling plate disposed within the battery tray, the cooling plate having an inlet spigot connected to an inlet line for receiving a coolant, and an outlet spigot connected to an outlet line for returning the coolant;

a plurality of battery modules disposed on the cooling plate; and a coolant containment system connected to the battery tray, the coolant containment system comprising:

a coolant retention container having a plurality of retainer side walls connected to a bottom wall and defining a containment space, the bottom wall defining an opening through which the inlet spigot and outlet spigot extend therethrough;

an inlet disposed in one of the retainer side walls of the coolant retention container and extending therethrough, the inlet connected to the inlet line;

an outlet disposed in the one retainer side wall of the coolant retention container and extending therethrough, the outlet connected to the outlet line;

a drain plug disposed in the one retainer side wall of the coolant retention container and in communication with the containment space, the drain plug allowing one-way fluid communication from the containment space to an environment outside the battery pack; and a one-way valve disposed in another of the retainer side walls of the coolant retention container, the one-way valve configured to allow any coolant located in the battery tray to enter the containment space, wherein the inlet spigot, outlet spigot, the inlet line, and outlet line are disposed entirely within the containment space, and wherein the coolant from a leak is retained within the containment space and exits the containment space to the environment outside the battery tray via the drain plug.

* * * * *